United States Patent
Ball et al.

(10) Patent No.: US 7,020,032 B2
(45) Date of Patent: Mar. 28, 2006

(54) REDUNDANT MEMORY ARCHITECTURE WITH DEFRAGMENTATION CAPABILITY

(76) Inventors: Darrell Gordon Ball, 1531 Scottanne Street, Ottawa, Ontario (CA) K4P 1G8; Piero Sorrini, 6 Redcar Crescent, Ottawa, Ontario (CA) K2K 3E2

( * ) Notice: Subject to any disclaimer, the term of this patent is extended or adjusted under 35 U.S.C. 154(b) by 59 days.

(21) Appl. No.: 10/810,808

(22) Filed: Mar. 29, 2004

(65) Prior Publication Data
US 2005/0162944 A1 Jul. 28, 2005

(30) Foreign Application Priority Data
Jan. 22, 2004 (CA) .................................. 2455656

(51) Int. Cl.
*G11C 7/00* (2006.01)
(52) U.S. Cl. .................. 365/200; 365/230.08; 365/233
(58) Field of Classification Search ................. 365/200, 365/230.03, 230.06, 230.08, 185.09, 233
See application file for complete search history.

(56) References Cited

U.S. PATENT DOCUMENTS

| 6,453,404 B1* | 9/2002 | Bereznyi et al. ............ 711/171 |
| 6,714,467 B1* | 3/2004 | Terzioglu et al. ........... 365/200 |
| 6,763,017 B1* | 7/2004 | Buckingham et al. ...... 370/352 |

* cited by examiner

*Primary Examiner*—Gene N. Auduong
(74) *Attorney, Agent, or Firm*—Kramer & Amado, P.C.

(57) ABSTRACT

A redundant memory architecture having an active memory and an inactive memory. The active memory supports in-service storage operations. The inactive memory is updated with stored contents of the active memory. Stored contents of the inactive memory are defragmented prior to an activity switch that results thenceforth in the inactive memory assuming the in-service storage operations and the active memory being updated with the stored contents of the inactive memory. The redundant memory architecture further has a data structure to maintain correspondence between the stored contents of the active memory and those of the inactive memory.

15 Claims, 3 Drawing Sheets

REDUNDANT MEMORY ARCHITECTURE WITH DEFRAGMENTATION CAPABILITY

FIELD OF THE INVENTION

The present invention relates generally to the field of redundant memory architectures and more particularly, to a method and apparatus for defragmentation of such architectures. By way of example, the present invention is particularly suited for adoption in communications networks to a redundant memory architecture that is shared by traffic flows, connections or calls belonging to varied communications protocols and which therefore are associated with different memory utilization and memory residency requirements.

BACKGROUND OF THE INVENTION

It is well known by those skilled in the art of memory storage that the phenomenon of memory fragmentation results in the relatively inefficient utilization of memory space, since unused memory storage locations will become interspersed throughout occupied memory locations of the memory space as fragmentation ensues. This results in the overall storage area in a fragmented memory space being higher than the overall storage area that would ordinarily be obtained by aggregating the occupied memory locations. The process of defragmentation of a memory space is intended to populate the unused memory storage locations as aforesaid with the contents of occupied memory locations, resulting in a compacting of the occupied memory locations and typically in a reduction of the overall storage area exhibited thereby.

Where storage memory architectures are utilized in the field of networked communications, for instance in a telecommunications node such as a switch, fragmentation results generally in a decreased efficiency of memory utilization during the operation of the switch. A storage memory architecture may be shared by different traffic flow types, connection types or call types. For instance, a memory pool may be shared by both ATM and MPLS connections, and such connection types will be associated with different unit storage sizes. As a result, fragmentation in the memory pool can be expected to take place as connections are established and released. In the particular case of MPLS connections being assigned to a given volume of memory, such connections themselves would have storage requirements that are variable in size. Again, fragmentation can be expected to occur as MPLS connections with variable storage requirements are established and released.

Oftentimes, a certain volume of memory in the form of a memory limit may be allocated to different types of connections traversing a switch. In such instances, memory fragmentation may also result in the memory limit for a connection type to be met in less than the most cost effective manner, since a larger proportion of the memory limit will become occupied by unused memory locations as the memory becomes progressively more and more fragmented. As well, if it is intended to change the memory limits respectively allocated to the different connection types as aforesaid, this may become more difficult to accomplish while a switch is operating due to ensuing fragmentation.

Although it is known in the art of communications networks to defragment memory while it is in use, the in-service real time performance of the telecommunications switch may be degraded while defragmentation is taking place. This may result in longer set-up times for the establishment of network connections. There is also some risk that connection information which is stored in the memory architecture may be lost during the defragmentation process if it takes place while the memory is in use. This may potentially result in dropped network connections. Moreover, the larger the memory employed, the longer the duration of the defragmentation process, with the result that the potential for foregoing problems to take place is heightened.

There is therefore a need for a memory architecture which enables defragmentation while alleviating some or all of the problems associated with the known memory architectures discussed above.

SUMMARY OF THE INVENTION

According to a broad aspect of the present invention, there is provided a redundant memory architecture comprising an active memory supporting in-service storage operations and an inactive memory that is synchronized with stored contents of the active memory, wherein stored contents of the inactive memory are defragmented prior to an activity switch which results thenceforth in the inactive memory assuming said in-service storage operations and in the active memory being updated with the stored contents of the inactive memory, the redundant memory architecture further comprising a data structure to maintain correspondence between the respective stored contents of the active memory and the inactive memory.

BRIEF DESCRIPTION OF DRAWINGS

By way of illustration and not of limitation, embodiments of the present invention are next described with reference to the following drawings, in which.

DETAILED DESCRIPTION OF PREFERRED EMBODIMENTS

Figure 1:
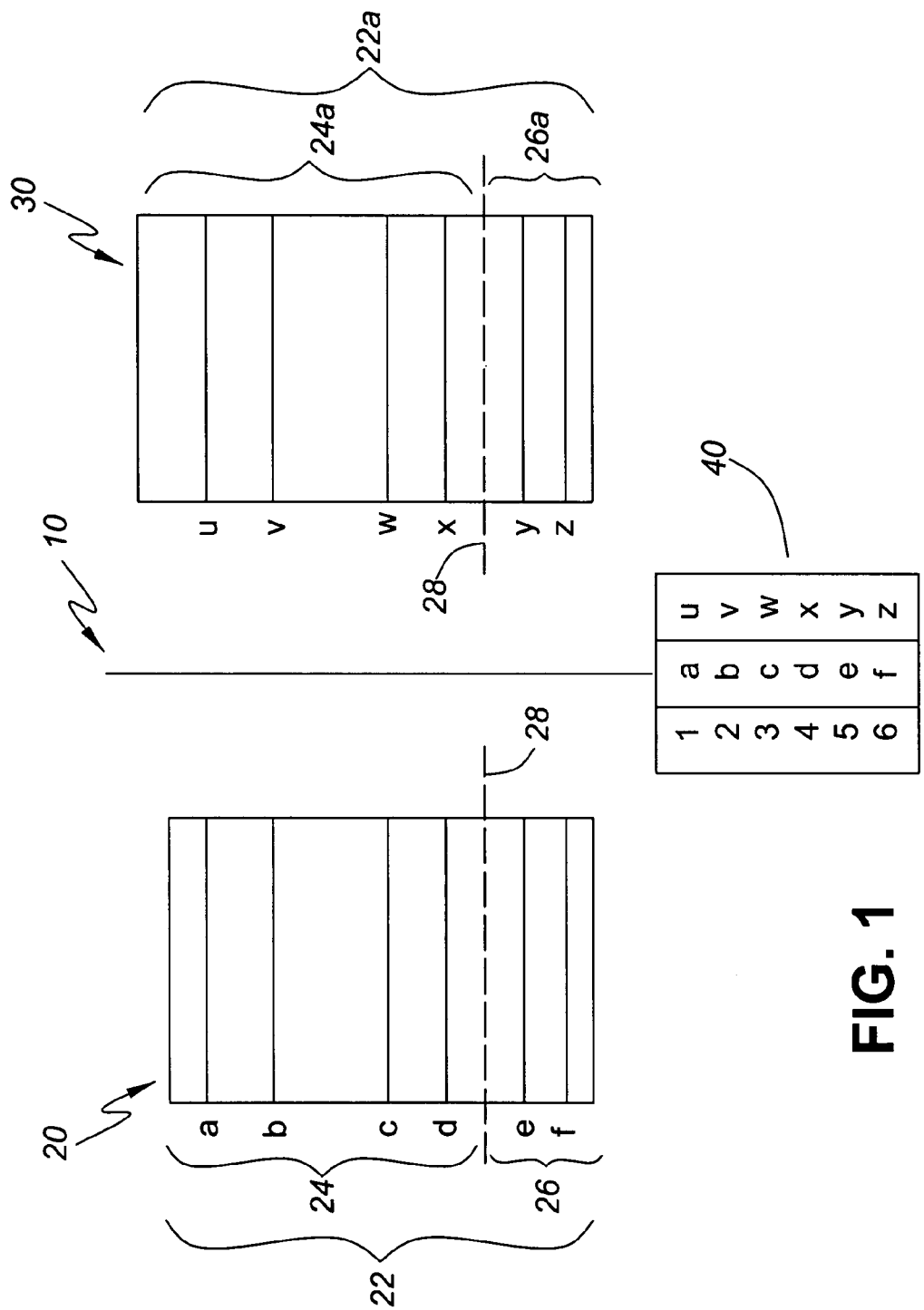
FIG. 1 is a schematic representation of a redundant memory architecture according to an embodiment of the present invention, showing an active memory pool and an inactive memory pool.

With reference to FIG. 1, a redundant memory architecture 10 according to the present invention comprises a first memory pool 20 and a second memory pool 30. Each memory pool 20, 30 may for instance be a random access memory (RAM) or the like. The memory pools 20, 30 may be located within, or otherwise associated with, a network node or other like network device such as a switch system (not shown). At any given time during the operation of the memory architecture 10, one of the memory pools 20, 30 will be active and the other inactive. For instance, in the example depicted in FIG. 1, the memory pool 20 is active and the memory pool 30 is inactive. The active memory pool 20 is used to establish and terminate various network connections 1 to 6, each of which is associated with connection information 22 that is respectively found at storage locations labeled a, b, c, d, e and f.

In the particular example of FIG. 1, the active memory pool 20 is initially partitioned as at 28 for supporting different network connection types. For instance, a first predetermined size of memory in the form of a first memory limit may be allocated to ATM connections 1 to 4 associated with connection information 24 that is respectively found at the storage locations of the active memory 20 labeled a, b, c and d. A second predetermined size of memory in the form of a second memory limit may be allocated to MPLS connections 5 and 6 associated with connection information 26 that is respectively found at the storage locations of the active memory 20 labeled e and f. Although the example depicted in FIG. 1 shows two partitioned memory segments of the active memory 20 corresponding to ATM connection information 24 and MPLS connection information 26, more than two partitioned memory segments may be envisaged according to the present invention. Likewise, the present invention can be applied to memory pools 20, 30 that are not partitioned in the aforesaid manner.

During operation of the active memory pool 20, the inactive memory pool 30 is synchronized or updated at intervals with the contents of the active memory pool 20. For instance, such updating may take place at periodic intervals. Alternatively, such updating may take place following the stored contents of the active memory pool 20 being changed, for instance whenever connections are established and terminated. Following updating, the contents of the inactive memory pool 30, comprising the connection information 22a, will match those of the active memory pool 20 as shown in FIG. 1. Each of the connections associated with the connection information 24a that is respectively found at the storage locations of the inactive memory 30 labeled u, v, w and x will therefore correspond to each of the connections associated with the connection information 24 that is respectively found at the storage locations of the active memory 20 labeled a, b, c and d. Likewise, each of the connections associated with the connection information 26a that is respectively found at the storage locations of the inactive memory 30 labeled y and z will therefore correspond to each of the connections associated with the connection information 26 that is respectively found at the storage locations of the active memory 20 labeled e and f. This correspondence is maintained in a cross-reference table 40 or the like, which maps the connections 1 to 6 in relation to the storage locations a to f of the connection information of the active memory 20. Furthermore, the cross-reference table 40 in turn maps the storage locations a to f of the connection information of the active memory 20 to the corresponding storage locations u to z of the connection information of the inactive memory 30. The cross-reference table 40 has been depicted schematically in tabular format. However, those skilled in the art will appreciate that the correspondence between connections and the associated storage locations can equally be maintained by way of pointers, hash tables or any other suitable data structures.

Figure 2:
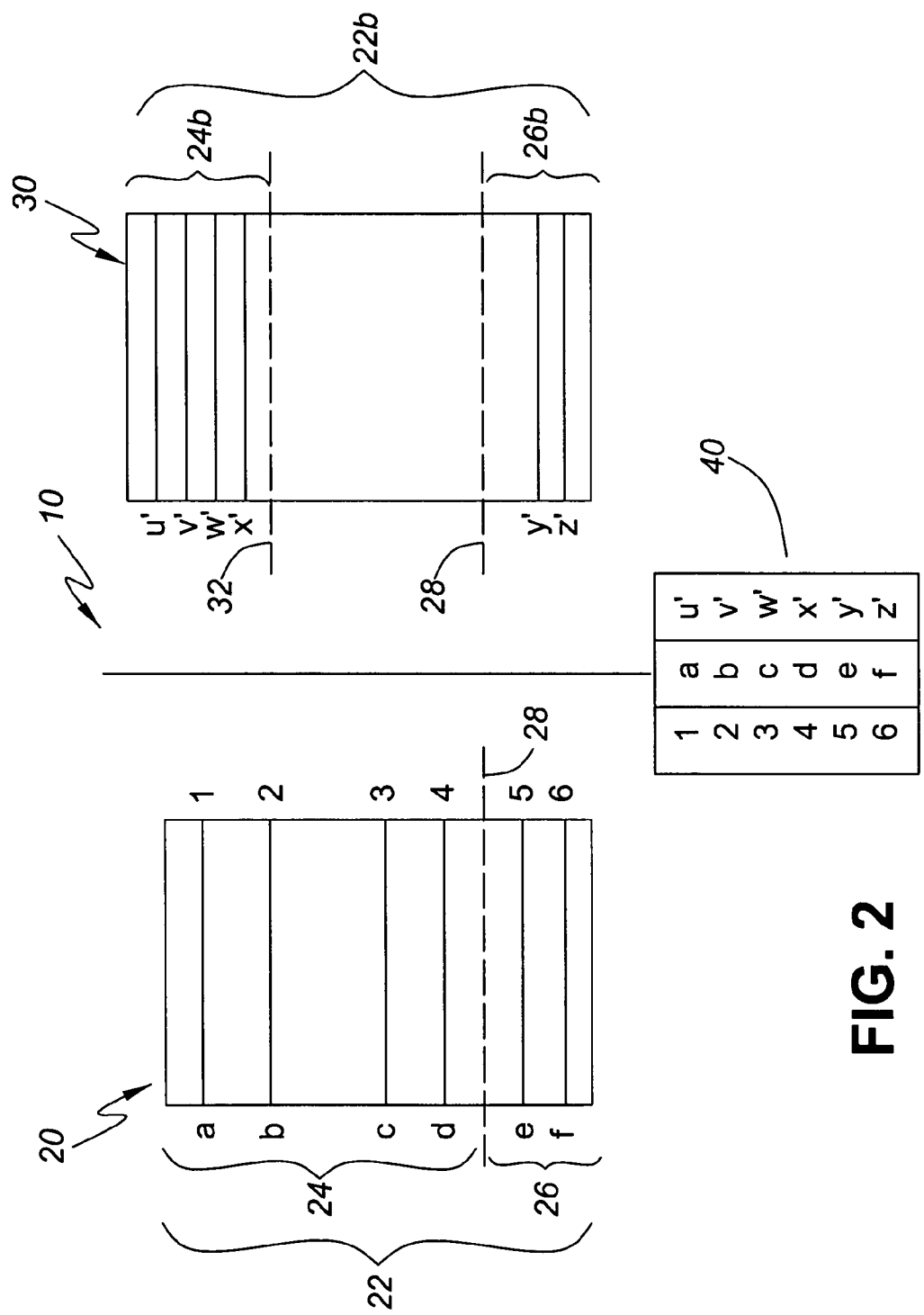
FIG. 2 is a schematic representation of the redundant memory architecture of FIG. 1, wherein the inactive memory pool has undergone a process of memory defragmentation.

Turning to FIG. 2, as connections are established and terminated in the active memory 20, fragmentation will ensue in the manner previously explained. Those skilled in this art will appreciate that when the active memory 20 is fragmented, the amount of memory occupied by connection information will be greater than the size of the connection information itself because unused memory locations are interspersed throughout the occupied memory locations. Once some predetermined measure of fragmentation of the active memory 20 is surpassed, the corresponding contents of the inactive memory 30 may be compacted as at 22b by undergoing memory defragmentation according to techniques well known to those in this art. Those skilled in this art will further understand that the process of defragmentation of the inactive memory 30 will result in the same connection information being stored therein using less memory than when such information is stored in a fragmented state, since some or all of the interspersed unused memory locations mentioned above will be populated with the contents of occupied memory locations. As explained previously, this will result in a compacting of the occupied memory locations and typically in a reduction of the overall storage area exhibited thereby.

Following compacting, the contents of the inactive memory pool 30, comprising the connection information 22b, will be expected to match those of the active memory pool 20 as shown in FIG. 2. Each of the connections associated with the compacted connection information 24b that is respectively found at the storage locations of the inactive memory 30 labeled u', v', w' and x' will therefore correspond to each of the connections associated with the connection information 24 that is respectively found at the storage locations of the active memory 20 labeled a, b, c and d. Likewise, each of the connections associated with the compacted connection information 26b that is respectively found at the storage locations of the inactive memory 30 labeled y' and z' will therefore correspond to each of the connections associated with the connection information 26 that is respectively found at the storage locations of the active memory 20 labeled e and f. This correspondence continues to be maintained in the cross-reference table 40 or the like as aforesaid. The use of the cross-reference table 40 allows the inactive memory 30 to be defragemented as described above while maintaining a correlation between corresponding connection information stored in each of the memory pools 20, 30.

Figure 3:
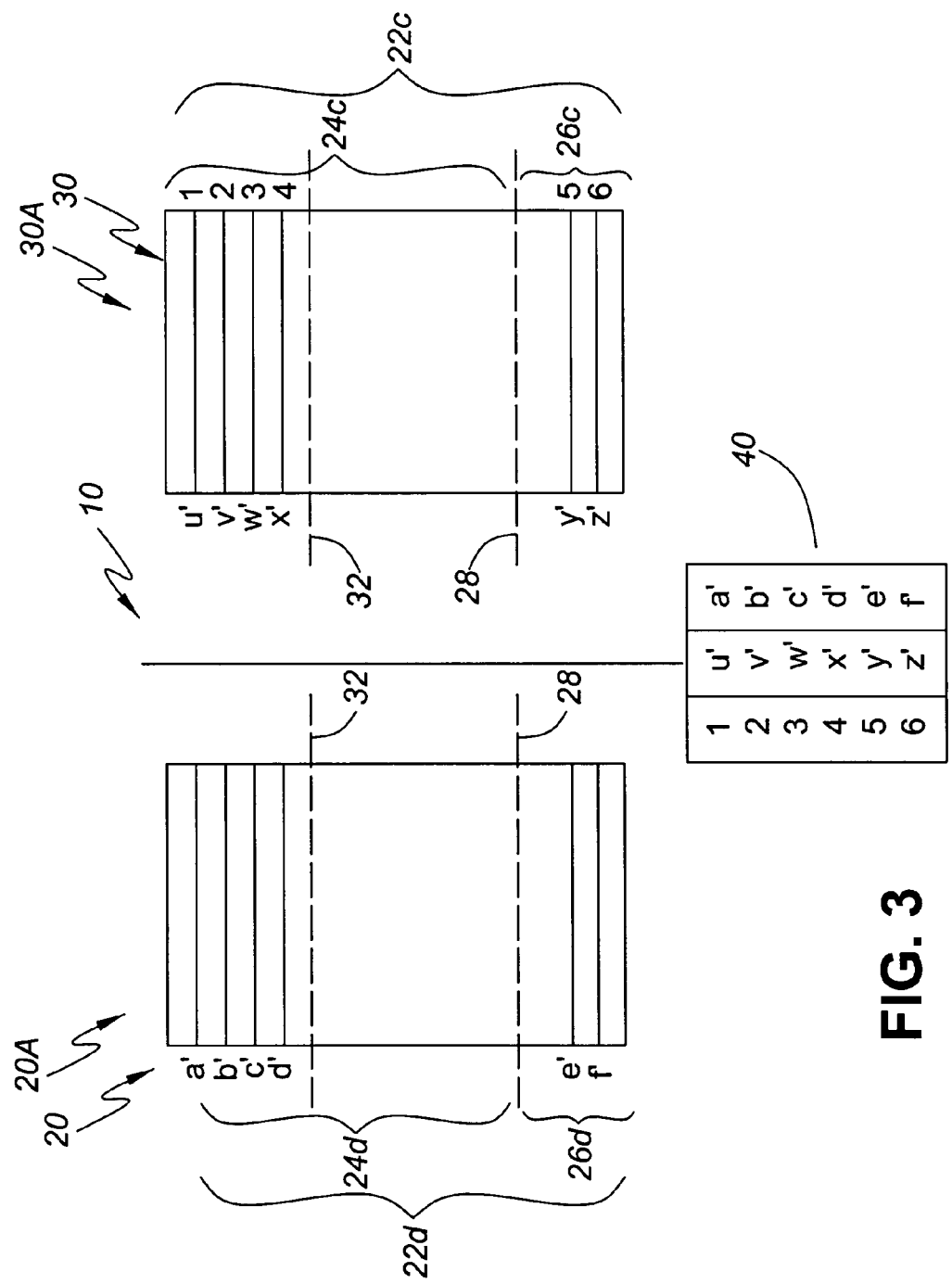
FIG. 3 is a schematic representation of the redundant memory architecture of FIG. 2, wherein an activity switch has been executed so as to produce a newly active memory pool and a newly inactive memory pool.

With reference now to FIG. 3, upon or following completion of defragmentation of the inactive memory 30, the contents of the active memory 20 may if desired be overwritten or otherwise replaced with the contents of the inactive memory 30. Thereafter, an activity switch is executed in order to render the inactive memory 30 into a newly active memory, which has been concurrently labeled 30A in FIG. 3. As such, the newly active memory 30A is thenceforth used to establish and terminate the various network connections 1 to 6, as well as others (not shown). The active memory 20 is therefore rendered into a newly inactive memory, which has been concurrently labeled 20A in FIG. 3. The occurrence of the activity switch mentioned above will effectively result in more memory being made available in the newly active memory 30A, due to its larger amount of contiguous memory as compared to the newly inactive memory 20A.

As was explained above with earlier reference to FIG. 1, during the continued operation of the newly active memory pool 30A, the newly inactive memory pool 20A is updated at intervals with the contents of the newly active memory pool 30A. Following updating, the contents of the newly inactive memory pool 20A, comprising the connection information 22d, will match those of the newly active memory pool 30A as shown in FIG. 3. Each of the connections associated with the connection information 24d that is respectively found at the storage locations of the newly inactive memory 20A labeled a', b', c' and d' will therefore correspond to each of the connections associated with the connection information 24c that is respectively found at the storage locations of the newly active memory 30A labeled u', v', w' and x'. Likewise, each of the connections associated with the connection information 26d that is respectively found at the storage locations of the newly inactive memory 20A labeled e' and f' will therefore correspond to each of the connections associated with the connection information 26c that is respectively found at the storage locations of the newly active memory 30A labeled y' and z'. This correspondence is once again maintained in the cross-reference table 40 or the like, which maps the connections 1 to 6 in relation to the storage locations u' to z' of the connection information of the newly active memory 30A. Furthermore, the cross-reference table 40 in turn maps the storage locations u' to z' of the connection information of the newly active memory 30A to the corresponding storage locations a' to f of the connection information of the newly inactive memory 20A. The process as explained above is then repeated for so long as the memory architecture 10 is being operated in a redundant manner.

As was mentioned above, the active memory pool 20 of FIG. 1 is partitioned as at 28 for supporting different network connection types. All things being equal, the previously defined second predetermined size of memory that is allocated to MPLS connections 5 and 6 may be expected to exhibit a higher rate of fragmentation than the first predetermined size of memory that is allocated to ATM connections 1 to 4. Those skilled in this art will appreciate that this could very well be the case in many instances since MPLS connections are associated with connection information having storage requirements that are variable in size. The assessment or measuring of fragmentation is well known to those skilled in the art. It will therefore be understood that for purposes of determining when to trigger defragmentation of the particular one of the memory pools 20, 30 that at any given time is deemed inactive, fragmentation may be assessed on the basis of the overall or aggregated memory pool in question. However, as a result of the potential for differing rates or tendencies of fragmentation to occur in each of the predetermined sizes of memory partitions, it may also be desirable to measure fragmentation in each of the memory partitions separately. In this manner, the whole of the memory pool that is deemed inactive may be subjected to defragmentation when any of the memory partitions thereof surpasses a predetermined measure of fragmentation respectively assigned thereto. Those skilled in the art will understand that the present invention may also be applied at the level of individual memory partitions as opposed to an aggregated memory space. In this manner, defragmentation and activity switching may take place separately in respect of each individualized memory partition.

According to the invention as described above, an activity switch was executed following the completion of defragmentation of the inactive memory pool 30. Those skilled in this art will appreciate that it may be necessary to synchronize the contents of the inactive memory 30 with the contents of the active memory pool 20 immediately following defragmentation and prior to executing the activity switch as aforesaid. This is to ensure that connection information which is stored or deleted in the active memory pool 20 during defragmentation is stored in the newly defragmented inactive memory pool 30 prior to the contents of the active memory pool 20 being lost as a result of an impending activity switch. Those skilled in this art will understand that such synchronization need not take place where connection information is not permitted to be stored or deleted in the active memory pool 20 for the entire duration of defragmentation of the inactive memory pool 30. Likewise, such synchronization need not take place where the particular defragmentation process permits the storage or deletion of connection information during defragmentation.

The partitioning as at 28 of the active memory pool 20 in FIG. 1 may result in various configurations or size allocations of partitioned memory segments. A first predetermined size of memory in the form of the first memory limit as defined above may, for instance, occupy 75% of each of the memory pools 20, 30. In this example, the second predetermined size of memory in the form of the second memory limit as defined above will therefore instead occupy 25% of each of the memory pools 20, 30. If the service mix of connection traffic in a communications switch changes such that it may become necessary to adjust the said memory limits, the present invention allows for any such adjustment to be made in relation to the inactive memory 30 as shown in FIG. 2. Namely, following defragmentation of the inactive memory 30, the initial memory partitioning as at 28 may be readjusted as at 32 prior to executing an activity switch in order to allocate more storage to MPLS connection information relative to ATM connection information. In this example, the first predetermined size of memory as aforesaid may, for instance, occupy 25% of each of the memory pools following the said readjustment. As for the second predetermined size of memory as aforesaid, it will therefore instead occupy 75% of each of the memory pools 20, 30 following such readjustment.

According to another embodiment of the present invention, defragmentation of the inactive memory pool 30 may take place at intervals and without being triggered by surpassing a predetermined measure of fragmentation of the active memory pool 20 as previously described. Instead, when a predetermined measure of fragmentation of the active memory pool 20 takes place, an activity switch as described previously may then ensue on the basis that the inactive memory pool 30 has been kept in an acceptably defragmented state by defragmentation which has previously occurred at intervals. Such intervals may be periodic or may even be variable based upon a level of usage of the active memory, for instance the level of connection volumes being processed at any particular time by the switching system in question. As is the case for the earlier described embodiment of the present invention, it may be necessary following any defragmentation of the inactive memory pool 30 to synchronize its contents with those of the active memory pool 20 prior to the execution of an activity switch, for the reasons previously provided. Likewise, the embodiment of the present invention which provides for defragmentation at intervals also lends itself to the implementation of memory partitions in the manner discussed above, and to the reallocation of such memory partitions, again as discussed above.

According to a still further embodiment of the present invention, an activity switch between the active memory pool 20 and the inactive memory pool 30 need not necessarily follow or be triggered by the surpassing of a predetermined measure of fragmentation of the active memory pool 20 as previously described. Rather, the activity switch may be triggered by any other event. Alternatively, an activity switch need not be triggered by any event at all, and instead may take place at intervals or on demand. For instance, the activity switch may be predicated on a need to reallocate the memory partitions of the memory pools 20, 30 as previously described.

Those persons skilled in this art will appreciate that the present invention allows for defragmentation to be performed on an inactive redundant memory, such that the in-service performance of a counterpart active memory need not be impacted. The redundant memory architecture as described herein also conveniently provides for a backup version of the active memory in the event of service failure. As well, those skilled in this art will understand that when the present invention is implemented in the particular shared memory architecture illustrated in FIGS. 1 to 3, the said architecture may be deployed to support network users who may wish to transition between two different network protocols having different traffic flow types, connection types or call types. Likewise, the said shared memory architecture can be utilized in multi-service networks, since the network nodes or switching systems thereof must be capable of adapting to changes in the proportional distribution of traffic flow types, connection types or call types that these networks are designed to carry. It will be apparent to those versed in the art that various modifications of detail may be made to the present invention, all coming within its spirit and scope.

We claim:

1. A redundant memory architecture comprising an active memory supporting in-service storage operations and an inactive memory that is synchronized with stored contents of the active memory, wherein stored contents of the inactive memory are defragmented prior to an activity switch which results thenceforth in the inactive memory assuming said in-service storage operations and in the active memory being updated with the stored contents of the inactive memory, the redundant memory architecture further comprising a data structure to maintain correspondence between the respective stored contents of the active memory and the inactive memory.

2. The redundant memory architecture as claimed in claim 1, wherein the contents of the inactive memory are defragmented at intervals.

3. The redundant memory architecture as claimed in claim 2, wherein the contents of the inactive memory are defragmented at periodic intervals.

4. The redundant memory architecture as claimed in claim 1, wherein the contents of the inactive memory are defragmented upon a predetermined measure of fragmentation of the active memory being surpassed.

5. The redundant memory architecture as claimed in claim 2, wherein the contents of the inactive memory are defragmented at intervals based upon a level of usage of the active memory.

6. The redundant memory architecture as claimed in claim 1, wherein the inactive memory is synchronized with the stored contents of the active memory at intervals.

7. The redundant memory architecture as claimed in claim 6, wherein the inactive memory is synchronized with the stored contents of the active memory following the stored contents of the active memory being changed.

8. The redundant memory architecture as claimed in claim 1, wherein the data structure is a cross-reference table.

9. The redundant memory architecture as claimed in claim 1, wherein prior to the activity switch and immediately following the contents of the inactive memory being defragmented as aforesaid, the inactive memory is synchronized with the stored contents of the active memory.

10. The redundant memory architecture as claimed in claim 1, wherein the contents of the active memory are replaced with the contents of the inactive memory once the contents of the inactive memory have been defragmented as aforesaid.

11. The redundant memory architecture as claimed in claim 1, wherein the active memory and the inactive memory are tach partitioned into memory segments.

12. The redundant memory architecture as claimed in claim 4, wherein the active memory and the inactive memory are each partitioned into memory segments.

13. The redundant memory architecture as claimed in claim 12, wherein the predetermined measure of fragmentation is assessed for partitioned memory segments of the active memory in the aggregate.

14. The redundant memory architecture as claimed in claim 13, wherein the predetermined measure of fragmentation is assessed for partitioned memory segments of the active memory separately.

15. The redundant memory architecture as claimed in claim 11, wherein the memory segments of the inactive memory may be adjusted as to their size allocation following the contents of the inactive memory being defragmented as aforesaid.

* * * * *